March 7, 1950 H. A. DUMFORD 2,499,819
CATTLE STANCHION
Filed Nov. 25, 1947 2 Sheets-Sheet 1
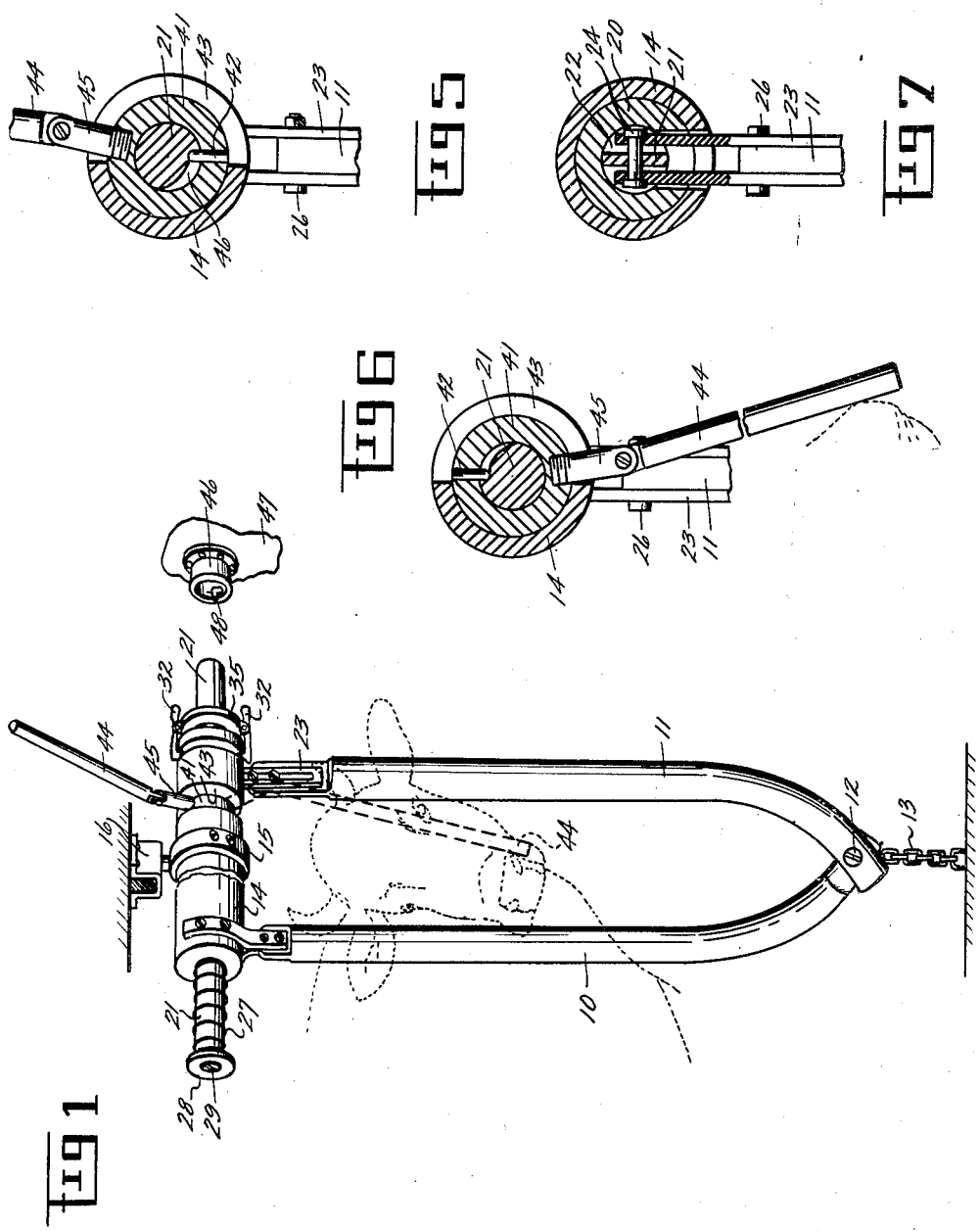
INVENTOR.
HARRY A. DUMFORD
BY
ATTORNEY—

March 7, 1950 — H. A. DUMFORD — 2,499,819
CATTLE STANCHION
Filed Nov. 25, 1947 — 2 Sheets-Sheet 2
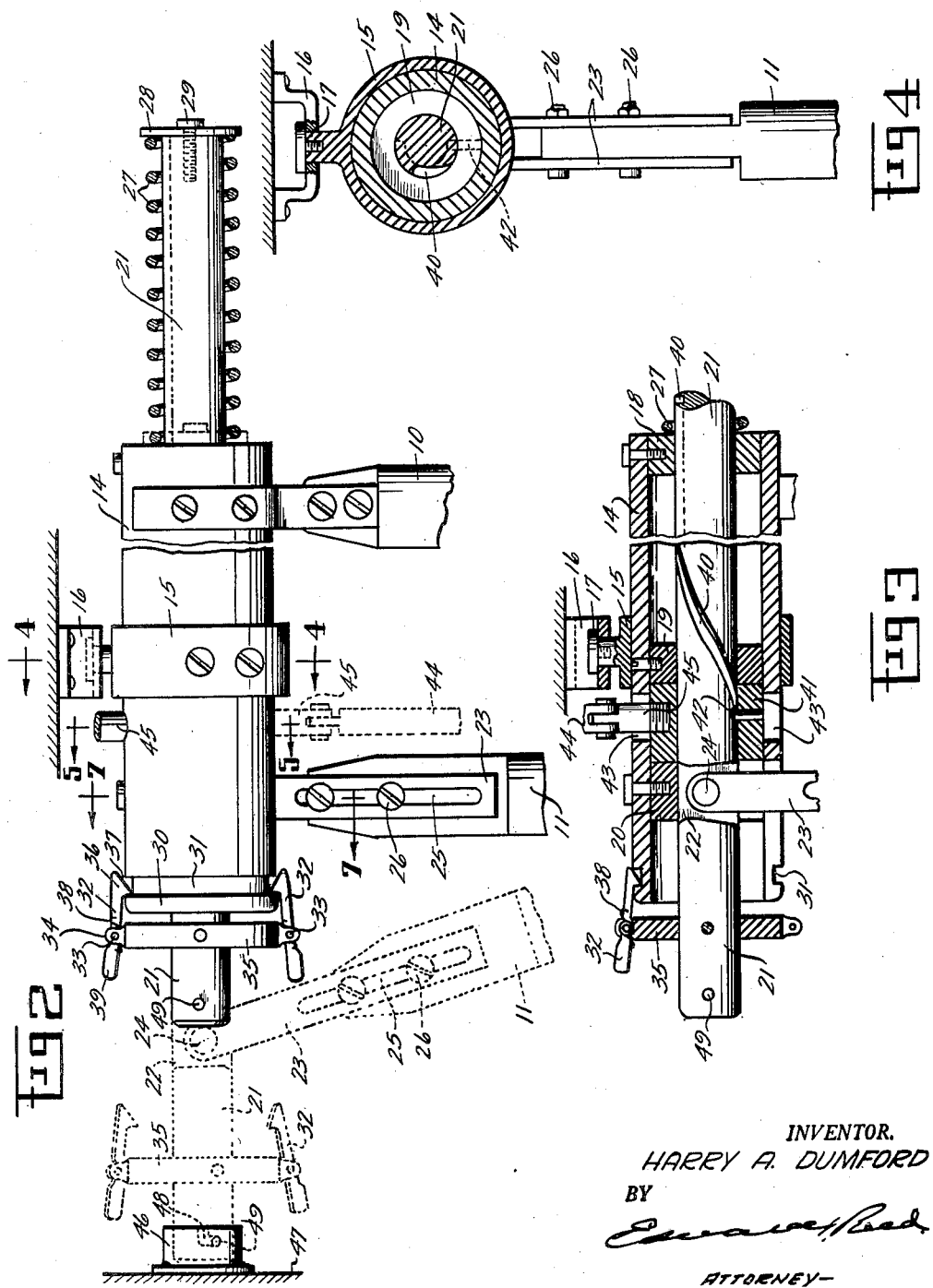
INVENTOR.
HARRY A. DUMFORD
BY Edward Reed
ATTORNEY—

Patented Mar. 7, 1950

2,499,819

UNITED STATES PATENT OFFICE 2,499,819

CATTLE STANCHION

Harry A. Dumford, Greene County, Ohio

Application November 25, 1947, Serial No. 787,977

15 Claims. (Cl. 119—147)

This invention relates to a cattle stanchion of the general type commonly used in dairy barns and the like.

One object of the invention is to provide a stanchion which will be automatically moved to and locked in closed position when a cow or other animal enters the same, that is when the cow's head is moved between and beyond the upright members of the stanchion.

A further object of the invention is to provide such a stanchion in which the movable member or bar of the stanchion is automatically locked in its open position and is released automatically by an animal entering the stanchion and is automatically moved to and locked in stanchion closing position.

A further object of the invention is to provide a controlling device for a stanchion which is of a simple but strong construction and is not liable to be injured by a cow confined therein.

A further object of the invention is to provide such a controlling device which is complete in itself and can be easily installed.

Other objects of the invention may appear as the mechanism is described in detail.

In the accompanying drawings Fig. 1 is a perspective view, partly broken away, of a stanchion embodying my invention; Fig. 2 is a side elevation of a controlling device and parts of the stanchion bars; Fig. 3 is a longitudinal section through the controlling device, partly broken away; Fig. 4 is a transverse section taken on the line 4—4 of Fig. 2; Fig. 5 is a section taken on the line 5—5 of Fig. 2 showing the releasing arm in its elevated position; Fig. 6 is a similar view showing the releasing arm in its lowered position; and Fig. 7 is a transverse section taken on the line 7—7 of Fig. 2;

In these drawings I have illustrated one embodiment of my invention but it is to be understood that this embodiment is shown for the purpose of illustration and that the mechanism as a whole, as well as the several parts thereof, may take various forms and may be applied to stanchions or other devices of various kinds, without departing from the spirit of the invention.

In the construction here shown the stanchion comprises two upright members or bars 10 and 11 one of said bars being movable toward and from the other to close and open the stanchion. In the particular arrangement illustrated the two bars are pivotally connected one with the other at their lower ends, as shown at 12, and are connected with the floor by a flexible device, such as a chain 13. The bar 10 is rigidly supported at its upper end, as by securing the same to one end of the controlling device, and the bar 11 is movable with relation to the bar 10 and is connected at its upper end with a movable part of the controlling device. The controlling device is here shown as comprising a tubular supporting structure 14 adapted to be supported from an overhead structure and here shown as having mounted about the same a collar 15 which is connected with a fixed bracket 16 by a headed stud 17, thus permitting the supporting structure and the stanchion bars to move about a vertical axis. Arranged within the tubular structure are a plurality of bearings, in the present instance 3, as indicated at 18, 19 and 20. Slidably mounted in these bearings is an elongate member 21 preferably in the nature of a round rod. The forward portion of the slidable member 21 is provided with means whereby it may be operatively connected with the movable bar 11 and in the present arrangement the slidable member 21 is provided in its opposite sides with recesses 22 to receive the end portions of metal straps 23 which connect the slidable member with the upper end of the bar 11. The straps 23 are pivotally connected with the slidable member by a pivot pin 24 and the slots 22 are of such width that the straps may have a limited movement about the axis of the pin 24. The connection between the slidable member and the bar 11 is extensible to permit the same to be extended as the bar moves from its vertical or closed position to its inclined or open position. For this purpose the straps 23 are provided with longitudinal slots 25 and are slidably connected with the bar 11 by screws or other attaching devices extending through the slots.

The slidable member is provided with automatically controlled power means for moving the same rearwardly to position the movable bar 11 in an upright and substantially vertical stanchion closing position, in which it is so spaced from the bar 10 that a cow's head cannot be withdrawn between the bars. Preferably this is accomplished by the use of a spring or springs, and in the construction illustrated the slidable member 21 extends rearwardly beyond the tubular structure 14 and a coiled spring 27 is confined between the end bearing 18 and a head 28 at the rear end of the slidable member, the head being here shown as a disk removably attached to the member 21 by a screw 29. In the present arrangement the lower portions of the forward end of the tubular structure and of the bearing 20 are slotted to receive the straps 23 which connect the bar 11 with the slidable member.

The slidable member 21 and bar 11 may be locked in their retracted or stanchion closing positions in any suitable manner. Preferably this locking means is automatic and the locking is effected by the rearward movement of the member 21 by the spring 27. In the present instance the forward end of the tubular body is provided with a keeper 30 which is here shown in the nature of a circumferential flange formed on the end of the tubular structure by a groove 31. Mounted on the slidable member 21 in front of the tubular housing are locking members adapted to ride over the keeper 30 as the slidable member is retracted by the spring and to move into locking engagement with the keeper. These locking members may take various forms and in the form shown they are in the nature of levers 32 pivotally mounted between their ends, at 33, on ears 34 carried by a collar or disk 35 rigidly secured to the member 21. Each arm is provided at its rear end with a locking nose 36 having a beveled inner edge 37 to engage and ride over the keeper 30, and a spring 38 acting on the lever yields to permit the nose to ride over the keeper and then presses the nose into locking engagement with the keeper. The locking devices may be retracted to permit the stanchion to be opened, to release the cow, in any suitable manner, as by utilizing the forward ends 39 of the locking members as finger pieces by which the locking members may be moved to inoperative positions.

The slidable member 21 is provided within the tubular structure with a spiral groove 40 and a collar 41 is mounted about the slidable member and has therein a pin 42 extending into the spiral groove 40. The collar rotates about the member 21 and is held against axial movement, as by locating the same between the bearings 19 and 20. A circumferential slot 43 is formed in one side of the tubular structure and is of a length just slightly in excess of half the circumference of that structure. An arm 44 is carried by the collar 41 and is here shown as including a stud 45 threaded into an opening in the collar, the outer portion of the arm being adjustably connected with the stud for movement to different angular positions with relation thereto. When the stanchion is closed, as shown in Fig. 1, the arm 44 extends upwardly and is so spaced from the bars 10 and 11 so that the head of a cow in the stanchion cannot come in contact therewith. When the slidable member 21 is moved forwardly to open the stanchion the arm is moved downwardly to a position just in front of the stanchion where it will be engaged and actuated by the head of a cow entering the stanchion, for a purpose which will hereinafter appear.

When the slidable member and movable bar are moved to stanchion opening positions they are automatically locked in those positions, and remain locked until they are automatically released by the movement of the arm 44 so that they may be moved rearwardly to stanchion closing positions by the spring 27. The locking device may take various forms and it is here shown as a socket 46 rigidly secured to a fixed structure 47 adapted to receive the forward end of the slidable member when the movable bar has completed its opening movement. The end portion of the slidable member 21 is provided with a stud 49 and a bayonet slot 48 is formed in the wall of the socket 46. The stud 49 and the longitudinal portion of the slot 48 are so arranged that as the slidable member approaches the end of its opening movement the stud 49 will enter the slot. The arrangement of the collar 41 and the spiral groove 40 are such that the stud 45 of the arm 44 will engage the lower end of the slot 43 in the tubular structure and thus interrupt the rotation of the collar after the locking stud 49 has entered the bayonet slot. Upon the stopping of the rotation of the collar 41 the further axial movement of the slidable member 21 will impart a slight rotation to the slidable member and the stud will be moved into the transverse portion of the bayonet slot and the slidable member will be locked against reverse movement. It will be noted by reference to Fig. 7 that the straps 23 which connect the slidable member with the movable bar are loosely connected with the slidable member so as to hold the latter against substantial rotation but permit sufficient rotation thereof to effect the locking and unlocking of the slidable member. When the arm 44 is actuated by a cow entering the stanchion the slidable member 21 will be rotated in the opposite direction to move the stud 49 into the longitudinal portion of the bayonet slot 48 and thus release the slidable member and movable bar 11 for movement by the spring 27 to stanchion closing positions, and as above stated these parts are automatically locked in those positions by the locking members 32.

When the stanchion is unoccupied the movable bar 11 will normally be locked in stanchion open position and when a cow enters the stanchion her head engages the trip arm 44 and releases the movable bar and the latter is moved quickly to stanchion closing position by the spring 27 and is automatically locked in that position by the locking devices 32. When the cow is to be released from the stanchion the locking devices 32 are moved to inoperative positions and the slidable member is pressed forwardly against the action of the spring to open the stanchion and the slidable member and movable bar are automatically locked in their open positions.

While I have shown and described one embodiment of my invention, I wish it to be understood that I do not desire to be limited to the details thereof as various modifications may occur to a person skilled in the art.

Having now fully described my invention what I claim as new and desire to secure by Letters Patent is:

1. In a device for controlling the opening and closing movements of the movable bar of a cattle stanchion, a supporting structure, a member mounted on said structure for axial movement and for rotary movement and having means whereby it may be connected with said movable bar, spring means for moving said member axially in a direction to move said bar to stanchion closing position, means for moving said member against the action of said spring means to move said bar to stanchion opening position, means controlled by the axial movement of said member for imparting rotary movement thereto, means controlled by the rotary movement of said member to lock said bar in its open position, means arranged to be controlled by an animal entering said stanchion to rotate said member in a direction to release the same for movement by said spring means, and means controlled by the last mentioned movement of said member for locking said bar in stanchion closing position.

2. In a device for controlling the opening and closing movements of the movable bar of a cattle stanchion, a supporting structure, a member mounted on said structure for axial movement and for rotary movement and having means whereby it may be connected with said movable bar, spring means for moving said member axially in a direction to move said bar to stanchion closing position, means for moving said member against the action of said spring means to move said bar to stanchion opening position, means controlled by the axial movement of said member for imparting rotary movement thereto, a locking element spaced from said structure to receive the end of said member when said bar is in stanchion opening position, said member having a part movable by said rotation thereof into locking relation to said locking element, means arranged to be controlled by an animal entering said stanchion to rotate said member in a direction to release the same for movement by said spring means, and means controlled by the last mentioned movement of said member for locking said bar in closing position.

3. In a device for controlling the opening and closing movements of the movable bar of a cattle stanchion, a supporting structure, a member slidably supported on said structure and having means whereby it may be connected with the movable bar of the stanchion, spring means acting on said slidable member to move said bar to stanchion closing position, means for moving said slidable member against the action of said spring means to move said bar to stanchion opening position, means for locking said slidable member in stanchion opening position, a device movably supported on said structure for releasing said slidable member for movement by said spring means to stanchion closing position, means controlled by the movement of said slidable member to said stanchion opening position to move said device to a position to be actuated by an animal entering the stanchion, and means controlled by the movement of said slidable member by said spring means to lock the same in said stanchion closing position.

4. In a device for controlling the opening and closing movements of the movable bar of a cattle stanchion, a tubular structure having an opening in one wall thereof, a member supported in said structure for axial movement and rotary movement and adapted to be connected with the movable bar of the stanchion, spring means acting on said member to move said bar to stanchion closing postion, means for moving said member against the action of said spring means to move said bar to stanchion opening position, means for imparting rotary movement to said member as the latter approaches stanchion opening position, means controlled by the rotary movement of said member to lock the same in stanchion opening position, a releasing device supported in said structure for movement about said member and extending through said opening, means controlled by the movement of said member to said open position to move said releasing device to a position to be actuated by an animal entering said stanchion, means controlled by said releasing device when so actuated to rotate said member in a direction to release said member for movement by said spring means, and means controlled by the movement of said member by said spring means to lock the same in stanchion closing position.

5. A stanchion controlling device comprising a tubular structure having an opening through the wall thereof, an elongate member slidably and rotatably supported in said structure, held normally against rotation and having a spiral groove, a collar rotatable about said member and having a part extending into said groove, an arm carried by said collar and extending through the opening in the wall of said structure, and means for interrupting the rotation of said collar when said arm has moved to a predetermined position whereby the longitudinal movement of said elongate member in one direction will rotate said collar and said arm until said rotation is interrupted and will then impart rotary movement to said elongate member, and the movement of said arm in a reverse direction will rotate said elongate member in a reverse direction.

6. In a cattle stanchion, two laterally spaced upright bars, one of said bars being pivoted adjacent its lower end for movement toward and from the other bar, a supporting structure adjacent the upper ends of said bars, an elongate member supported on said structure for longitudinal movement with relation thereto, extensible means for connecting said movable bar with said elongate member for movement therewith in both directions of said movement, means controlled by the movement of said elongate member in one direction for locking the same against reverse movement, an arm movably supported by said structure, means controlled by the longitudinal movement of said elongate member for moving said arm to a position adjacent to and between the planes of said upright bars, means controlled by the movement of said arm from said position to release said elongate member from said locking means, and power means for moving said member in the other direction when it has been so released.

7. In a cattle stanchion, two laterally spaced upright bars, one of said bars being pivoted adjacent its lower end for movement toward and from the other bar, a supporting structure adjacent the upper ends of said bars, an elongate member supported on said structure for longitudinal movement with relation thereto, extensible means for connecting said movable bar with said elongate member for movement therewith in both directions of said movement, means controlled by the movement of said elongate member in one direction for locking the same against reverse movement, an arm movably supported by said structure, means controlled by the longitudinal movement of said elongate member for moving said arm to a position adjacent to and between the planes of said upright bars, means controlled by the movement of said arm from said position to release said elongate member from said locking means, spring means for moving said member in the other direction when it has been so released, and means controlled by the movement of said member by said spring means to lock said member in the position to which it has been moved.

8. In a cattle stanchion, two laterally spaced upright bars, one of said bars being movable toward and from the other bar to close and open the stanchion, a tubular structure supported adjacent the upper ends of said bars, a member supported in said structure for axial and rotary movements with relation thereto, means for connecting said movable bar with said member for movement therewith in both directions of said axial movement, means for imparting axial movement to said member to move said movable bar from said other bar and for imparting rotary movement to said member, means controlled by said rotary movement of said member for locking said movable bar in the position to which it has been so moved, a releasing device movable by said axial movement of said member to a position to be actuated by an animal entering said stanchion, means controlled by said releasing device when so actuated to rotate said member in a direction to release said member from said locking means, power means to impart axial movement to said bar when so released and move said movable member toward said other bar, means controlled by the last mentioned movement of said movable bar to lock the same in the position to which it has been moved.

9. In a cattle stanchion, two laterally spaced upright bars, one of said bars being movable toward and from the other bar to close and open the stanchion, a tubular structure supported adjacent the upper ends of said bars, a member supported in said structure for axial and rotary movements with relation thereto, means for connecting said movable bar with said member for movement therewith in both directions of said axial movement, means for imparting axial movement to said member to move said movable bar from said other bar and for imparting rotary movement to said member, means controlled by said rotary movement of said member for locking said movable bar in the position to which it has been so moved, a releasing device movable by said axial movement of said member to a position to be actuated by an animal entering said stanchion, means controlled by said releasing device when so actuated to rotate said bar in a direction to release said member from said locking means, said member extending beyond one end of said structure and having a head at its outer end, a spring confined between said head and said structure to move said member when so released in a direction to move said movable bar toward said other bar, and means controlled by the last mentioned movement of said movable bar to lock the same in the position to which it has been moved.

10. In a cattle stanchion, two laterally spaced upright bars, one of said bars being movable toward and from the other bar, a tubular structure supported adjacent the upper ends of said bars and having an opening in the wall thereof, an elongate member supported in said structure for axial and rotary movements with relation thereto, and held normally against rotary movement, means for connecting said movable bar with said member for movement therewith, means for moving said member axially in a direction to move said movable bar to stanchion opening position, means controlled by the rotary movement of said member to lock the same in said open position, power means for moving said member axially in a direction to move said movable bar to stanchion closing position, said member having a spiral groove located within said structure, a collar rotatable about said member, held against axial movement and having a part movable in said groove, an arm carried by said collar, extending through the opening in the wall of said structure and movable to and from a position to be actuated by an animal entering said stanchion, means for interrupting the rotation of said collar before said member has completed said axial movement, whereby the axial movement of said member in stanchion opening direction will move said arm to the aforesaid position, rotation will be imparted to said member to lock the same in its open position, and the actuation of said member by the animal will rotate said member to release the latter for movement by said power means.

11. In a cattle stanchion, two laterally spaced upright bars, one of said bars being movable toward and from the other bar, a tubular structure supported adjacent the upper ends of said bars and having an opening in the wall thereof, an elongate member supported in said structure for axial and rotary movements with relation thereto and held normally against rotary movement, means for connecting said movable bar with said member for movement therewith, means for moving said member axially in a direction to move said movable bar to stanchion opening position, means controlled by the rotary movement of said member to lock the same in said open position, power means for moving said member axially in a direction to move said movable bar to stanchion closing position, said member having a spiral groove located within said structure, a collar rotatable about said member, held against axial movement and having a part movable in said groove, an arm carried by said collar, extending through the opening in the wall of said structure and movable to and from a position to be actuated by an animal entering said stanchion, means for interrupting the rotation of said collar before said member has completed said axial movement, whereby the axial movement of said member in stanchion opening direction will move said arm to the aforesaid position, rotation will be imparted to said member to lock the same in its open position, and the actuation of said member by the animal will rotate said member to release the latter for movement by said power means, and means controlled by the last mentioned movement of said member to lock said movable bar in stanchion closing position.

12. In a device for controlling the opening and closing movements of the movable bar of a cattle stanchion, a supporting structure adapted to be mounted adjacent the upper ends of the stanchion bars, a control member movably supported on said structure and having means whereby the movable stanchion bar may be connected therewith for movement thereby in both directions of movement thereof, means for moving said control member in a direction to move said bar to stanchion opening position, means for locking said bar in said position, power means for moving said control member in a direction to move said bar to stanchion closing position, means operable by an animal entering said stanchion to release said control member for movement by said power means in the last mentioned direction, and means controlled by the movement of said control member to stanchion closing position to lock said bar in said closing position.

13. In a device for controlling the opening and closing movements of the movable bar of a cattle stanchion, a supporting structure adapted to be mounted adjacent the upper ends of the stanchion bars, a control member supported on said structure for movement in the direction of movement of said movable bar and having means whereby said movable bar may be pivotally connected therewith for movement thereby, means for moving said control member in a direction to move said bar to stanchion opening position, means controlled by said movement of said control member for locking said control member and said bar in stanchion opening position, power means for moving said control member in a direction to move said bar to stanchion closing position, means operable by an animal entering said stanchion to release said control member for movement by said power means in the last mentioned direction, and means controlled by the movement of said control member to stanchion closing position to lock said bar in said closing position.

14. In a device for controlling the opening and closing movements of the movable bar of a cattle stanchion, a supporting structure adapted to be mounted adjacent the upper ends of the stanchion bars, a control member supported on said structure for movement in the direction of movement of said movable bar and having means whereby said movable bar may be connected therewith for movement thereby in both directions of movement of said control member, spring means for moving said member in a direction to move said bar to stanchion closing position, means for moving said control member against the action of said spring means to move said bar to stanchion opening position, means controlled by the last mentioned movement of said control member for locking said bar in stanchion opening position, means operable by an animal entering said stanchion to release said control member for movement by said spring means to stanchion closing position, and means controlled by the movement of said control member by said spring means to lock said bar in stanchion closing position.

15. In a device for controlling the opening and closing movements of the movable bar of a cattle stanchion, a supporting structure adapted to be mounted adjacent the upper ends of the stanchion bars, a control member supported on said structure for movement in the direction of movement of said movable bar and having means whereby said movable bar may be connected therewith for movement thereby in both directions of movement of said control member, spring means for moving said member in a direction to move said bar to stanchion closing position, means for moving said control member against the action of said spring means to move said bar to stanchion opening position, means controlled by the last mentioned movement of said control member for locking said bar in stanchion opening position, means operable by an animal entering said stanchion to release said control member for movement by said spring means to stanchion closing position, and locking members carried by said structure and said control member and arranged to be brought into locking relation one with the other by the movement of said control member to stanchion closing position.

HARRY A. DUMFORD.

REFERENCES CITED

The following references are of record in the file of this patent:

UNITED STATES PATENTS

| Number | Name | Date |
|---|---|---|
| 1,104,863 | Baldwin | July 28, 1914 |
| 1,154,706 | Love | Sept. 28, 1915 |
| 1,158,008 | Stanfield | Oct. 26, 1915 |
| 1,161,802 | Fitzgerald | Nov. 23, 1915 |
| 1,282,758 | Clay | Oct. 29, 1918 |
| 1,286,441 | Stevenson | Dec. 3, 1918 |